L. G. KNIFFEN.
Mowing Machine.

No. 45,416.

2 Sheets—Sheet 1.

Patented Dec. 13, 1864.

Witnesses.
Henry Morns
C. L. Topliff.

Inventor
L. G. Kniffen
per Munn & Co.
Attorneys

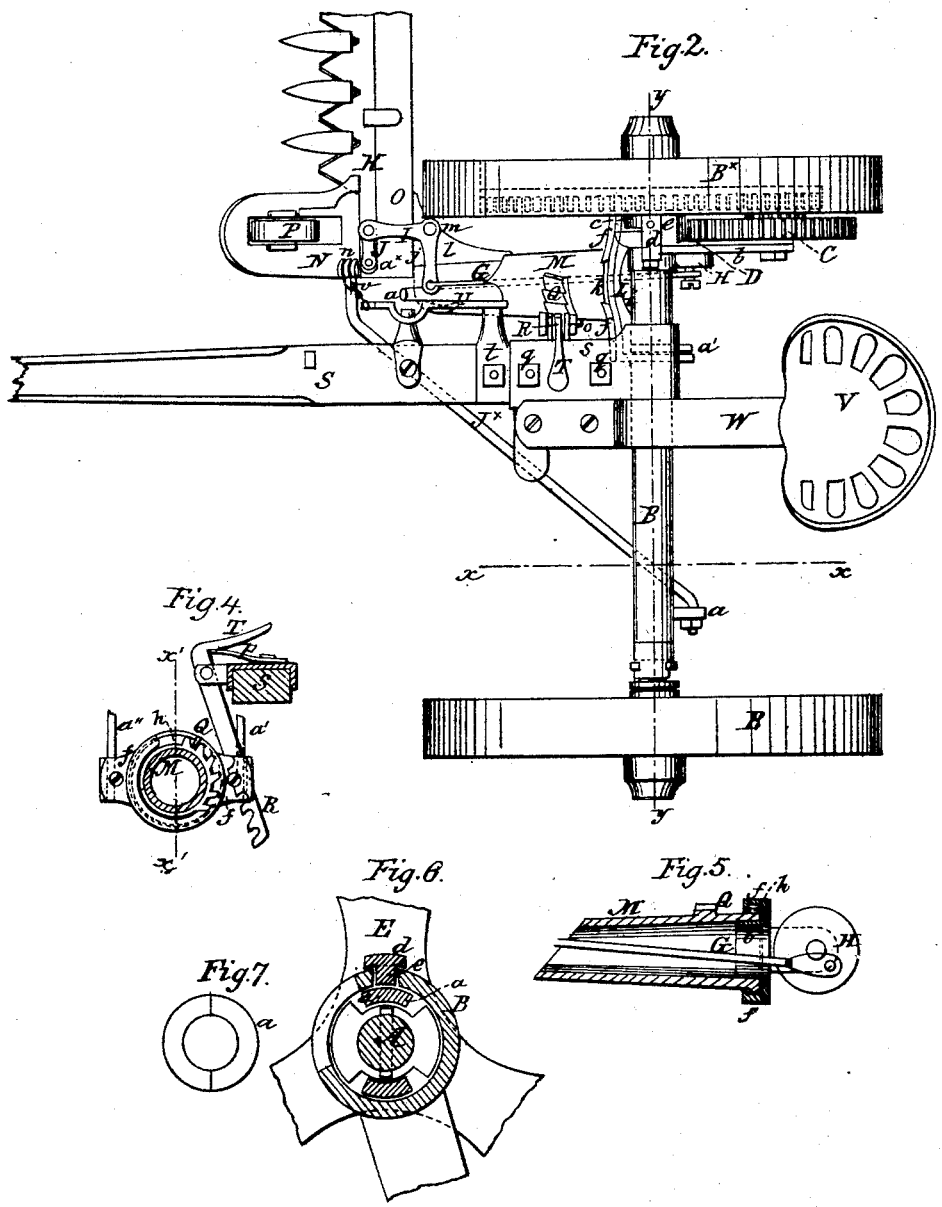

UNITED STATES PATENT OFFICE.

L. G. KNIFFEN, OF WORCESTER, MASSACHUSETTS.

IMPROVEMENT IN MOWING-MACHINES.

Specification forming part of Letters Patent No. 45,416, dated December 13, 1864.

*To all whom it may concern:*

Be it known that I, L. G. KNIFFEN, of Worcester, in the county of Worcester and State of Massachusetts, have invented certain new and useful Improvements in Mowing-Machines; and I do hereby declare that the following is a full, clear, and exact description thereof, which will enable any one skilled in the art to make and use the same, reference being had to the accompanying drawings, making a part of this specification, in which—

Figure 1:
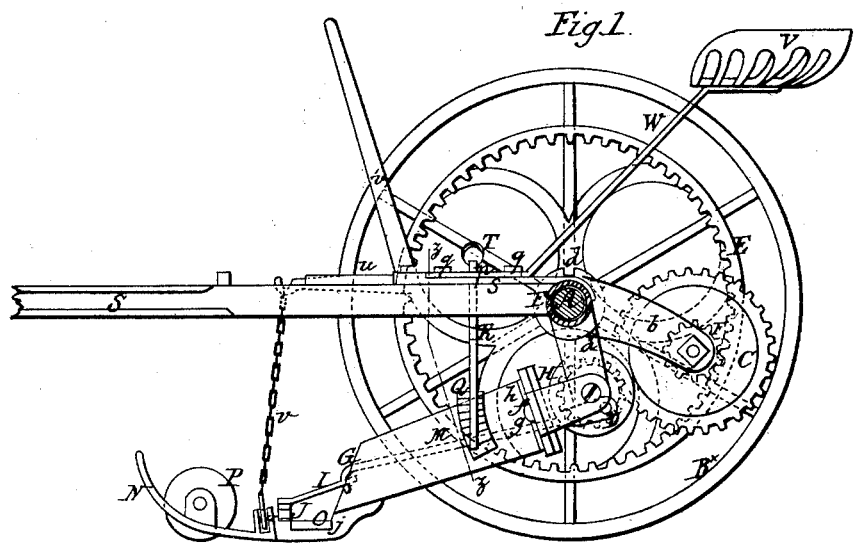
Figure 3:
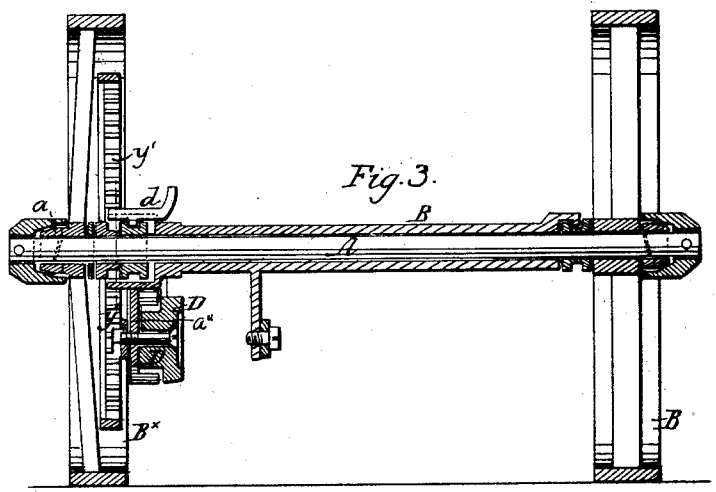

Figure 1 is a side sectional view of my invention, taken in the line $x\,x$, Fig. 2; Fig. 2, a plan or top view of the same; Fig. 3, a vertical transverse section of the same, taken in the line $y\,y$, Fig. 2; Fig. 4, a section of a portion of the same, taken in the line $z\,z$, Fig. 1; Fig. 5, a section of Fig. 4, taken in the line $x'\,x'$; Fig. 6, a section of Fig. 3, taken in the line $y'\,y'$; Fig. 7, a detached end view of one portion of a friction-clutch pertaining to the wheels of the machine.

Similar letters of reference indicate corresponding parts in the several figures.

This invention relates, first, to a novel and improved arrangement of a tubular axle and pendants, whereby the framing ordinarily used is dispensed with, and at the same time an extremely light and durable machine obtained.

The invention consists, second, in a toothed segment and rack arranged, as hereinafter fully shown and described, for raising and lowering the cutter-bar.

The invention consists, third, in a novel manner of attaching a tube, on which the toothed segment is secured, to the axle, whereby a firm connection is obtained, and one which admits of the free turning of the tube.

A represents the main portion of the axle of the machine, on which the wheels B$^\times$ B$^\times$ are fitted loosely and secured thereto by clutches $a$, so as to turn the part A when the machine is drawn forward and slip over said part when the machine is backed. These parts, not being new, do not require a minute description. B represents the tubular portion of the axle, which is fitted on A loosely, so that the latter may turn freely within the former. This tube B has three pendants, $a\,a'\,a''$, attached to or cast with it, and it also has an arm, $b$, projecting from its rear side, slightly inclined from a horizontal position, and having a toothed wheel, C, fitted to it, which gears into a pinion, D, the axis of the latter being in the lower part of the pendant $a''$.

On the part A of the axle there is fitted loosely a toothed wheel, E, which gears into a pinion, F, attached to the side of the wheel C. The wheel E is connected to the part A of the axle by means of a clutch, $c$, the movable or sliding part of which is connected to a slide, $d$, which works in a groove, $e$, in the upper surface of the tube B. (See Figs. 1, 2, 3, and 6.) By adjusting or moving this slide the wheel E may be connected with or disconnected from the part A and the sickle rendered operative or inoperative, as desired. The sickle is driven by a pitman, G, the back end of which is connected to a crank-pulley, H, on the axis of the pinion D, the front end of the pitman being connected to one end of a bent lever, I, which is connected by a link, J, with the sickle-bar K, as shown clearly in Fig. 2.

To the lower ends of the two pendants $a'\,a''$ there is attached a plate, L, to the front surface of which two flanges, $f\,f$, are secured by screws $g$. These flanges lap over a rim, $h$, at the inner end of a tube, M, and secure said tube to the plate L and pendants $a'\,a''$, the tube fitting over a thimble, $b^\times$, attached to plate L, the whole forming a firm connection, and at the same time admitting of the free turning of the tube M. The pitman G passes through the tube M, a hole, $i$, being made in the plate L for the pitman to pass through, as shown in Fig. 2. The tube M is of slightly conical form, and it has a shoe, N, at its front end, the shoe being cast with the tube in one piece. This shoe projects a suitable distance in front of the finger-bar O, and it is provided or cast with a transverse groove or channel, $j$, to receive the inner end of the finger-bar, which is secured to the shoe by one or more bolts. At the junction of the shoe N and tube M there is a plate, $l$, which is also cast with the tube and shoe in one piece, and through this plate the fulcrum-pin $m$ of the bent vibrating lever I passes.

J$^\times$ is a brace rod or stay, the back end of which is connected to the lower end of the pendant $a$, and the front end connected by a joint, $n$, to the shoe N, just in front of the finger-bar O. (See more particularly Fig. 2.) In the shoe N there is placed a small wheel, P, which serves to reduce the friction between the finger-bar and the ground and consequently eases the draft.

On the exterior of the tube M there is a toothed segment, Q, which may be cast with the tube or made separately and secured to it, and R is a pendent rack, which is suspended by a pivot-bolt, $o$, from the back part of the draft-pole S, the upper part of the rack R having a foot-piece or treadle, T, projecting from it at right angles, and which extends over the draft-pole, as shown clearly in Fig. 2.

To the under side of the foot-piece or treadle T there is attached a spring, $p$, which has a tendency to keep the rack R out of gear with the toothed segment Q, as shown clearly in Fig. 4.

The draft-pole S is secured by bolts $q$ to a bar, $s$, cast with or attached to the tube B, and to the draft-pole, just in front of the bar $s$, there is secured transversely a short bar, $t$, on which a lever, U, is fitted and allowed to work freely. This lever U is of bent form, and to the end of its lower and shorter arm, $u$, there is attached a chain, $v$, the lower end of which is connected to the brace-rod $J^\times$, near its junction with the shoe N.

V is the driver's seat, which is secured to the upper end of an elastic bar, W, the lower end of the latter being bolted to the bar $s$, to which the draft-pole is attached. The link J of the bent lever I is connected to the sickle-bar K at the extreme inner end of the latter, as shown at $a^\times$ in Fig. 2, thereby leaving the inner end of the finger-bar perfectly free from all mechanical obstructions, the link not projecting beyond the end of the sickle-bar, and the lever I working over the finger-bar. By this arrangement the finger-bar is enabled to be raised entirely up out of the way without having any parts of the sickle-driving mechanism come in contact with braces or other parts of the machine.

From the above description it will be seen that the driver may at any time raise the inner end of the finger-bar by simply drawing back the upper end of the lever U, and the outer end of the finger-bar raised by pressing down the foot-piece or treadle T, so as to throw the rack R in gear with the toothed segment Q, and then drawing back the upper end of lever U. By drawing the lever U fully back the finger-bar will be turned upward and inclined out of the way against the draft-pole.

Having thus described my invention, what I claim as new, and desire to secure by Letters Patent, is—

1. The tube B, placed loosely on the part A, and provided with pendants $a$ $a'$ $a''$ and a groove, $e$, to receive the slide $d$ of clutch $c$, all arranged and combined as herein shown and described.

2. The toothed segment Q and pendent rack R, attached respectively to the tube M and draft-pole, or the bar $s$ thereof, and arranged, substantially as shown, to operate in connection with the lever U and chain $v$, or their equivalents, for the purpose specified.

3. The manner of connecting the tube M to the tube B of the axle, as described—to wit, by having a plate, L, attached to the pendants $a'$ $a''$ of the tube B, and flanges $f$ $f$ secured to the plate L, which flanges project over a rim, $h$, at the inner end of the tube M, whereby a firm connection of the tube with the axle is obtained, and the tube at the same time allowed to turn freely.

4. The arrangement of the connecting-rod G, bent lever I, and link J to the cutter-bar K, in combination with the tube M and shoe N, cast in one piece, as and for the purposes specified.

L. G. KNIFFEN.

Witnesses:
J. HENRY HILL,
HORACE LELAND.